No. 682,405. Patented Sept. 10, 1901.
G. L. & A. H. FAIRBANKS.
LATHE.
(Application filed Apr. 18, 1901.)
(No Model.)
Fig. I.
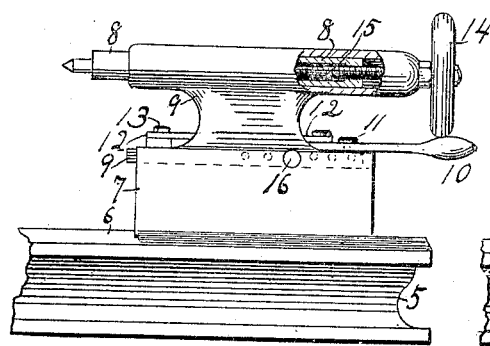
Fig. III.
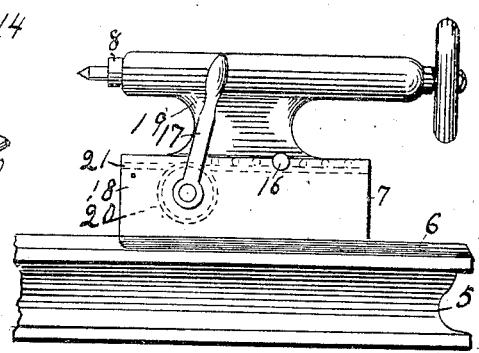
Fig. II.
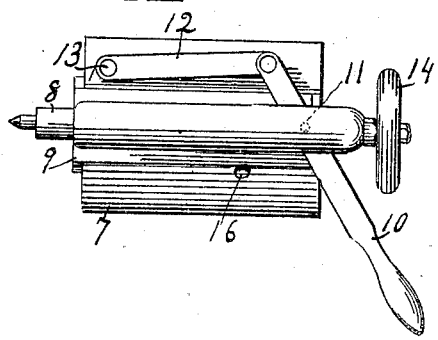
Fig. IV.
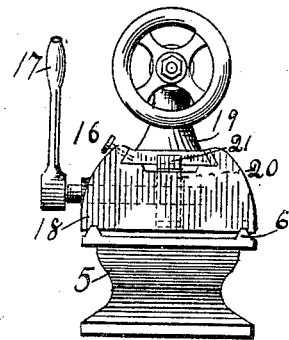
Witnesses
N. Stevens
E. Gray.
Inventors
George L. Fairbanks.
Arthur H. Fairbanks.
by W. R. Stevens Attorney
THE NORRIS PETERS CO., PHOTO-LITHO., WASHINGTON, D. C.

UNITED STATES PATENT OFFICE.

GEORGE LANDON FAIRBANKS AND ARTHUR H. FAIRBANKS, OF WORCESTER, MASSACHUSETTS.

LATHE.

SPECIFICATION forming part of Letters Patent No. 682,405, dated September 10, 1901.

Application filed April 18, 1901. Serial No. 56,394. (No model.)

*To all whom it may concern:*

Be it known that we, GEORGE LANDON FAIRBANKS and ARTHUR H. FAIRBANKS, citizens of the United States, residing at Worcester, in the county of Worcester and State of Massachusetts, have invented a new and useful Improvement in Lathes; and we do hereby declare the following to be a full, clear, and exact description of the same.

This invention relates to lathes such as are used for drilling and turning.

Heretofore lathes have been provided each with a tail-stock adapted to slide along the latheways and to be fastened at any point thereon, and the tail-stock is usually furnished with a spindle fitted to slide parallel with the ways and in perfect line with the working spindle of the lathe. It is usual to provide the tail-spindle with a feed-screw for sliding it longitudinally in its bearings, and some lathes are provided with a hand-lever to be substituted for the screw to slide the spindle when a quantity of work is to be done that does not demand the steady firmness of the screw-feed, the lever being much quicker than the screw in operation.

The objects of this invention are, first, to obtain the service of either the screw or the lever without the necessity of removing the screw to use the lever, and vice versa, and, secondly, to obtain the further advantage of the combined use of the screw and the lever.

To this end our invention consists in the construction and combination of parts forming the tail-stock of a lathe hereinafter more fully described and particularly pointed out in the claim, reference being had to the accompanying drawings, in which—

Figure I is a side elevation of a tail-stock of a lathe according to our invention, a part being broken away. Fig. II is a plan or top view of the same. Fig. III shows a modification of the same in side elevation, and Fig. IV is an end view of the modification.

Numeral 5 represents the bed of a lathe upon which the body 7 of the tail-stock is fitted to slide in any usual manner, such as upon the V-shaped ways 6, and this body is to be secured as usual at any desired point upon the ways when in service.

The spindle 8 is usually mounted directly in the body of the tail-stock; but by parting the body we interpose the carriage 9, which is the characteristic feature of our invention. This carriage 9 is gibbed to slide in the body 7 parallel with the ways 6, and the spindle is fitted to slide in the carriage in a line also parallel with the latheways.

10 is a lever, pivoted at 11 to the carriage 9 and connected with the body 7 at 13 by means of a link 12.

14 represents a common hand-wheel for operating the feed-screw 15 of the spindle 8, whereby the spindle may be worked forward and backward in the carriage.

16 represents a screw or pin passing through the side of the body 7 into the carriage 9 to hold it from sliding when desired. There may be a series of holes in the side of the carriage to receive the end of the pin or screw 16, so that the carriage may be held at various points along its path of motion.

In operation the carriage may be set by means of the lever 10 at the nearest pin-hole and be fastened there by the pin, and then the spindle may be operated by the feed-screw 15 as usual. Then when a hole has been drilled or other work done the carriage may be quickly withdrawn with the lever. The work may then be adjusted for another hole, the carriage be brought forward and pinned, and again the screw be used to feed the work in drilling, or in many cases the whole operation of feeding to the drill or to a hollow auger or other cutter, as in wood-work, may be rapidly done by the carriage and lever. Furthermore, the whole longitudinal movement of the carriage is added to the usual feed of the spindle to increase the field of operation. By means of this sliding carriage, combined with the spindle sliding in the same direction, the range of work that may be done on the lathe is increased as well as the speed and convenience in doing work.

In the modification shown in Figs. III and IV the lever 17, journaled in the body 18, operates the carriage 19 by means of a pinion 20 on the lever and a rack 21 on the carriage in a manner equivalent to the operation of the carriage 9 by the lever 10 described and would be more convenient where very long motion of the carriage is desired. This device is simple, efficient, and inexpensive.

Having thus fully described our invention, what we believe to be new, and desire to secure by Letters Patent, is the following:

In lathes, a tail-stock body fitted to be located upon the ways of the lathe; a lever connecting the carriage with the body to slide one relatively to the other, the carriage being provided with a series of pin-holes and the body with a pin to engage any one of the holes; a spindle fitted to slide longitudinally in the said carriage; and a screw to operate the spindle, substantially as described.

In testimony whereof we affix our signatures in presence of two witnesses.

GEORGE LANDON FAIRBANKS.
ARTHUR H. FAIRBANKS.

Witnesses:
A. A. CLARK,
JOHN W. SHEEHAN.